United States Patent Office 3,448,763
Patented June 10, 1969

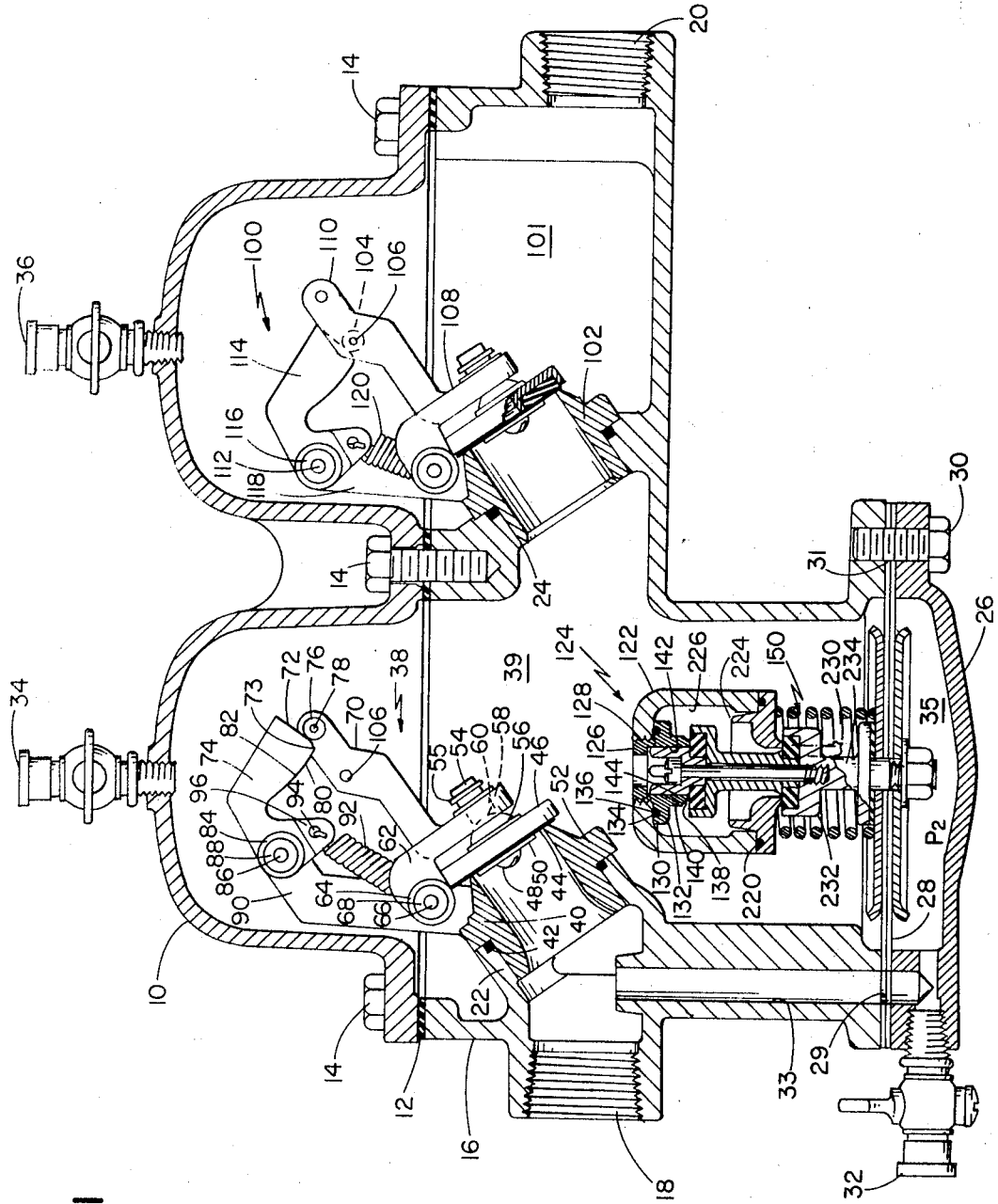

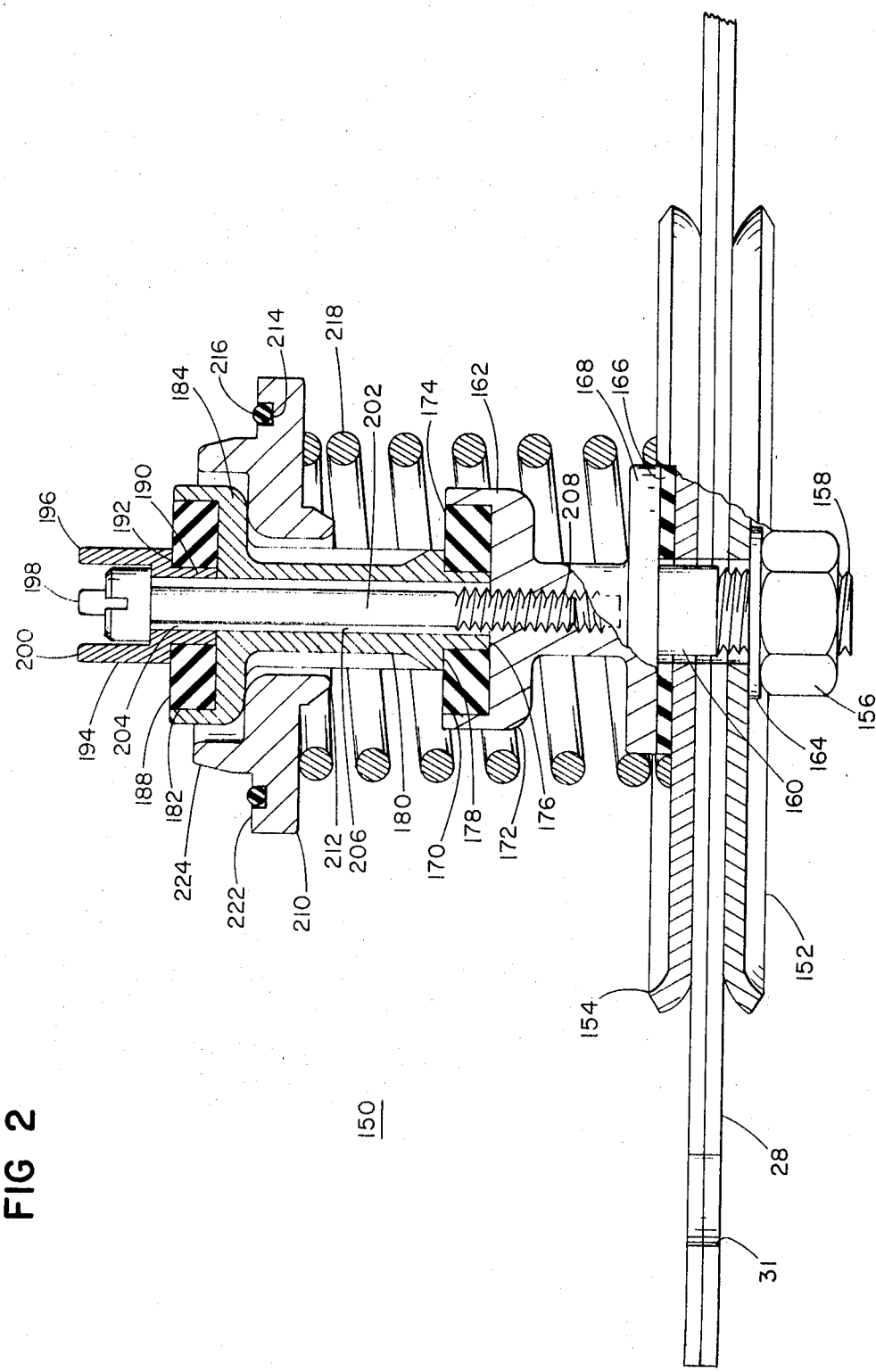

3,448,763
RELIEF VALVE
Alan Clarkson, Curtiss, Wellesley Hills, Mass., assignor to Hersey-Sparling Meter Company, Dedham, Mass., a corporation of Massachusetts
Filed Feb. 20, 1967, Ser. No. 617,110
Int. Cl. F16k 31/12, 31/36
U.S. Cl. 137—494                                      8 Claims

ABSTRACT OF THE DISCLOSURE

Relief valve has two valve seats spaced axially along a valve stem, a valve seat ring mounted therebetween for limited axial movement relative to a housing to which it is sealed by an axially deformable member, a pressure differential sensing diaphragm to which the stem responds in axial movement, and a spring biasing both the diaphragm and the ring.

---

This invention relates to a relief valve, and more particularly to a balanced relief valve having two or more valve elements operated as a unit by a differential pressure sensing diaphragm.

It is a primary object of the invention to provide such a relief valve in which the permissible dimensional tolerances of the valve parts are enlarged, and the force required for the proper sealing of the valve is reduced.

A further object of the invention is to provide such a relief valve in which the diaphragm and the other moving parts of the relief valve are easily removable and replaceable as a subassembly without special tools.

A further object of the invention is to provide such a relief valve which is inexpensive, reliable, and sensitive.

The invention features a relief valve including, in combination a valve stem, a first valve seat carried by the valve stem, a second valve seat carried by the valve stem and axially spaced along the valve stem from the first valve seat, a valve seat ring mounted around the valve stem and between the valve seats for limited axial movement relative to the valve stem and to a valve housing around the valve seat ring, and an axially deformable member sealably extending from the valve seat ring to the housing.

In preferred embodiments there is featured: a pressure differential sensor with the valve stem mounted on it; a pressure differential sensor utilizing a biased diaphragm; and a spring biasing the diaphragm and the valve seat ring axially against the housing.

Other objects, features, and advantages will appear from the following description of a preferred embodiment of the invention, taken together with the attached drawings thereof, in which:

FIG. 1 is a sectional side elevation view of a valve system employing a relief valve according to the invention.

FIG. 2 is a partially sectional side elevation view of the relief valve subassembly removed from the housing.

There is shown in FIG. 1 top case 10 mounted with gasket 12 by bolts 14 to bottom case 16, which contains an inlet port 18, outlet port 20 and two check valve throats 22 and 24. Diaphragm cover 26 mounts diaphragm 28, and the entire subassembly, FIG. 2, by means of bolts 30, only one of which is shown, and completes the closure of bottom case 16. Diaphragm 28 has apertures 31, only one of which is shown, for receiving bolts 30, and an aperture 29 aligned with passage 33 which communicates inlet pressure to diaphragm 28 in chamber 35. Normally closed cocks 32, 34 and 36 are used for draining and testing purposes.

Check valve assembly 38 in compartment 39 includes check valve seat 40 fastened in throat 22 against seal ring 42 and engages rubber face 44 fastened to clapper 46 by screw 48 and washer 50. Seat 40 is secured in position by bolts passing through bores, neither of which are shown, in flange 52. Shaft 54 secured by snap ring 55 and having hemispherical base 56 fastened to clapper 46, mates with enlarged hemispherical recess 58 and bore 60 in arm to form a self-leveling mounting for clapper 46. Cylindrical bearing 64 pivotable about shaft 66 on rubber bushing 68, supports arm 62 and roller carrier arm 70, which engages cam surface 72 of cam 74 by means of rubber roller 76 rotatably mounted on shaft 78.

Surface 72 is disposed at approximately 21 degrees in the counter-clockwise direction from the line defined by the centers of shaft 66 and shaft 78, in the closed clapper position shown. Cam surface 80 disposed at approximately 126½ degrees in the counter-clockwise direction from said line is connected to surface 72 by a circumferential curved surface 73 of approximately 0.05 inch radius, and to cam surface 82 which is disposed at approximately 109 degrees in the counter-clockwise direction from said line. Cylinderical bearing 84 is pivotable about shaft 86 on rubber bushing 88. Shafts 86 and 66 are mounted in support arm 90 formed integrally with flange 52. Spring 92, secured to shaft 66 and engaged with aperture 94 in detent 96, urges cam 74 to move clockwise and bear on roller 76.

Check valve assembly 100 mounted in throat 24 in compartment 101 is similar to check valve assembly 38 with the exceptions that: the internal surface of check valve seat 102 differs slightly from that of check valve seat 40; roller 104 is mounted in aperture 106 closer to clapper 108 on roller carrier arm 110; shaft 112 pivotally supporting cam 114 on rubber bushing 116 is mounted closer to valve seat 102 on support arm 118; spring 120 is smaller than spring 92. These differences follow from the reduced pressure and flow characteristics of the fluid flowing through throat 24.

Housing 122 of relief valve 124 integrally connected with bottom case 16 threadably receives valve seat ring 126 in bore 128. Flange 130 of valve seat ring 126 contains channel 132 for retaining seal ring 134 in engagement with inner bearing surface 136 of housing 122. Sealing edge 138 is formed at the junction of the outer wall 140 and inner wall 142 which defines bore 144 in valve seat ring 126.

Subassembly 150, FIG. 2, includes diaphragm plates 152 and 154 mounted on opposite sides of diaphragm 28 by means of nut 156 threadably engaged with shaft 158 on cylindrical extension 160 of valve stem 162. Metal washer 164 is used between plate 152 and nut 156 and rubber washer 166 is used between plate 154 and the lower face of flange 168 of valve stem 162. Bore 170 in enlarged section 172 of valve stem 162 retains annular resilient valve seat 174, a neoprene composition having a durometer rating of 65.0±0.5. Cylindrical extension 176 and shoulder 178 of inner valve stem 180 position resilient valve seat 174 in bore 170.

Bore 182 in enlarged section 184 of inner valve stem 180 retains a second annular resilient valve seat 188, having the same construction and composition as seat 174. Cylindrical extension 190, and shoulder 192 of seat guide 194, position resilient valve seat 188 in bore 182. Guide 194 has three fingers 196, 198, and 200 which slidably engage bore 144, FIG. 1. Bolt 202 passing through bore 204 in guide 194 and bore 206 in inner valve stem 180, threadably engages bore 208 in valve stem 162 to unitize these elements.

Valve seat ring 210 having sealing edge 212 and channel 214 for retaining seal ring 216, and mounted for axial movement along inner valve stem 180 between sections 172 and 184, is urged toward section 184 by spring 218, bearing on diaphragm plate 154. Seal ring 216 is a neoprene composition having a durometer rating of 65.0±0.5. Channel 214 is 0.139 inch wide and 0.077 inch deep, while seal ring 216 has a cross-section diameter of 3/32 inch. Spring 218 uses 0.130 diameter wire wound in 6.5 coils, 4.5 of which are active, having a mean diameter of 1.375 inch to provide a spring rate of 31 pounds per inch. It compresses seal ring 216 against sealing face 220, FIG. 1, on housing 122 to bring sealing face 222 of valve seat ring 210 within approximately 0.02 inch of sealing face 220 when subassembly 150 is installed in housing 122.

Installation of subassembly 150 is accomplished by positioning diaphragm 28 on diaphragm cover 26, aligning apertures 31 with bolts 30, then threading bolts 30 into bottom case 16. The length of bolts 30 is such that spring 218 presents negligible opposition at initial engagement of bolts 30, full compression of spring 218 taking place when bolts 30 are securely engaged.

Reception of guide 194 in bore 144 is facilitated by the action of diaphragm plates 152, 154 which maintain valve stems 162 and 180 substantially perpendicular to the plane of diaphragm 28, and by the centering action of tapered lip 224 on valve seat ring 210. As bolts 30 are engaged and advanced spring 218 forces seal ring 216, carried by valve seat ring 210, against sealing face 220 of housing 122, forming within housing 122 a chamber 226, which communicates with external atmospheric pressure through a passage, not shown, in bottom case 16. Advancing bolts 30 draws diaphragm 28 toward housing 122 against the pressure of spring 218, and drives resilient valve seats 174 and 188 against sealing edges 212 and 138, respectively, closing chamber 226. Thus, dimensional differences in the members of the relief valve, which prevent simultaneous meeting of valve seats 174 and 188 with their respective sealing edges 212 and 138, are accommodated by the floating action of valve seat ring 210 and seal ring 216, with only a small force required to insure proper sealing contact. The need for only a small force to insure sealing contact reduces the force on diaphragm 28.

In operation a fluid pressure at inlet port 18 encounters face 44 of check valve 38 and diaphragm 28 on relief valve 124 in chamber 35. When the inlet pressure approaches a value of 8 p.s.i. greater than the pressure within compartment 39, the moment of force present at roller 76 applied against cam surface 72 becomes sufficient to move cam 74 counter-clockwise against the force of spring 92. At approximately 8 p.s.i. pressure differential roller 76, moving counter-clockwise, makes the transition along surface 73 from cam surface 72, relatively perpendicular to the path of roller 76, to cam surface 80, relatively parallel to the path of roller 76. The differential pressure required to maintain valve 38 in intermediate or fully opened position is substantially the same as that required to perform the intial opening, 8 p.s.i, so that the pressure loss through valve 38 does not significantly increase with increased flow through it. The nearly constant valve opening force is the result of the cam surfaces 80 and 82 being disposed generally parallel to the path of roller 76. Check valve 100 operates in the same manner as check valve 38 with the exception that it is opened when the pressure in compartment 39 approaches 3 p.s.i. greater than that in compartment 101 as dictated by the modified design of check valve 100. Calibration of valves 38 and 100 is achieved by varying the diameter of their respective rollers 76 and 104, as required by the cumulative effect of the manufacturing tolerances of the various parts.

Relief valve 124 provides an additional safeguard against backflow, for which the pressure in compartment 39 approaches to within 5 p.s.i. of the pressure in chamber 35, the combined force of spring 218 and the pressure in compartment 39 drives diaphragm 28 away from valve seat ring 210, and draws valve seats 174 and 188 away from sealing edges 212 and 138, respectively. This action opens the valve, permitting the pressurized contents of compartment 39 to pass between fingers 196, 198, and 200, and between valve seat ring 210 and the inner valve stem 180, thereby escaping to the atmosphere through chamber 226. At a differential pressure of only 3 p.s.i. relief valve 124 is fully opened.

Relief valve 124 is a balanced valve: there are no axial forces tending to open or close the valve aside from the force exerted by diaphragm 28 in opposition to spring 218, despite water pressure variation. The unsealing force exerted by the pressurized fluid in compartment 39 on the area within the circumference of sealing edge 138 is offset by the sealing force exerted by the same fluid on annular area 230 on face 232 of enlarged section 172. Annular area 230 has an inner perimeter defined by the circumference of neck 234 of valve stem 162 and an outer perimeter defined by the circumference of sealing edge 212. The area within annular area 230 occupied by neck 234 does not contribute to these forces on the valve because neck 234 extends to diaphragm 28 and its cross-sectional area is not exposed to the fluid in compartment 39. The annular area external to annular area 230 on face 232 is equal to and oppositely directed relative to the annular area external to sealing edge 212 on valve seat 174; thus the combined axial force exerted by these areas is zero.

Portions of the subject matter disclosed but not claimed in this application and relating to check valves are the joint invention of Alan C. Curtiss and Roger W. Hood.

Other embodiments will occur to those skilled in the art and are within the following claims.

What is claimed is:
1. A relief valve comprising, in combination
 a valve stem,
 a first valve seat carried by said valve stem,
 a second valve seat carried by said valve stem axially spaced along said valve stem from said first valve seat,
 a valve seat ring mounted around said valve stem and between said valve seats for limited axial movement relative to said valve stem and relative to a valve housing around said valve seat ring,
 an axially deformable member sealably extending from said valve seat ring to said housing,
 a diaphragm for sensing differential pressure, said valve stem being mounted for axial movement responsive to pressure differential across said diaphragm, and
 a spring biasing said diaphragm and additionally biasing said valve seat ring axially against said housing.
2. A relief valve subassembly for mounting in a housing, having a first valve seat ring secured thereto, comprising
 a diaphragm for sensing differential pressure,
 a valve stem extending from one surface of said diaphragm,
 a first and a second valve seat retained in spaced relation to each other on said valve stem,
 a second valve seat ring mounted around said valve stem between said first and second valve seats,
 a spring extending between said diaphragm and said second valve seat ring for urging said second valve seat ring away from said diaphragm and toward said housing,
 a sealing ring for positioning between said second valve seat ring and said housing under the force of said spring, when said subassembly is installed in said housing with said first and second valve seats in operative relation with aid first and second valve seat rings, respectively.
3. The relief valve subassembly of claim 2 in which one of said valve seat rings and valve seat sets includes a resilient element extending in sealing relation between them.

4. The relief valve subassembly of claim 2 in which both of said valve seat rings and valve seat sets includes a resilient element extending in sealing relation between them.

5. A relief valve subassembly comprising
a valve stem connected with a mounting member,
a first valve seat carried by a first support on said valve stem,
a second valve seat carried by a second support on said valve stem axially spaced along said value stem from said first valve seat and support,
a valve seat ring, having a sealing edge for engagement with said first valve seat, mounted around said valve stem and between said valve seats,
a spring, axially located by said mounting member, for urging said valve seat ring against said second support.

6. The relief valve subassembly of claim 5 further comprising an axially deformable member carried by said valve seat ring for engagement with a relief valve housing.

7. The relief valve subassembly of claim 5 in which said mounting member includes a raised flange for centering said spring concentrically with said valve stem.

8. The relief valve subassembly of claim 5 in which said mounting member includes a differential pressure sensing diaphragm.

References Cited

UNITED STATES PATENTS

| 1,892,883 | 1/1933 | Goldkamp | 137—625.34 XR |
| 3,035,608 | 5/1962 | Ray | 137—505.18 XR |
| 3,204,657 | 9/1965 | Boyd | 137—505.18 XR |
| 3,344,807 | 10/1967 | Lehrer et al. | 137—630.19 XR |

DANIEL BLUM, *Primary Examiner.*

U.S. Cl. X.R.

137—503, 505; 251—282